United States Patent [19]
Pannell et al.

[11] Patent Number: 5,333,718
[45] Date of Patent: Aug. 2, 1994

[54] APPARATUS FOR HANDLING PLASTIC EATING UTENSILS

[76] Inventors: Lorris O. Pannell, 927 Belvedere Ct., Winston-Salem, N.C. 27127; W. C. Faircloth, Jr., Rte. 13, Box 3075, Lexington, N.C. 27292

[21] Appl. No.: 111,129
[22] Filed: Aug. 24, 1993
[51] Int. Cl.5 .............................................. B65G 47/22
[52] U.S. Cl. ................................... 198/397; 198/396; 198/550.01
[58] Field of Search ............. 198/393, 396, 397, 550.01

[56] References Cited

U.S. PATENT DOCUMENTS

| | | | |
|---|---|---|---|
| 2,609,912 | 9/1952 | Engel | 198/397 |
| 2,649,214 | 8/1953 | Kirby et al. | 198/397 X |
| 2,891,697 | 6/1959 | Beckers | 198/393 X |
| 3,621,900 | 11/1971 | Rood | 198/393 X |
| 3,776,346 | 12/1973 | Dubuit | 198/396 |
| 4,099,609 | 7/1978 | Kieronski et al. | 198/397 X |
| 4,732,263 | 3/1988 | Franciscus | 198/397 X |
| 5,062,521 | 11/1991 | Hockman | 198/396 X |

FOREIGN PATENT DOCUMENTS 2361219 6/1975 Fed. Rep. of Germany ...... 198/393
0008126 1/1988 Japan .................. 198/393

Primary Examiner—James R. Bidwell

[57] ABSTRACT

An apparatus for removing a plurality of irregularly shaped plastic eating utensils, particularly knives, sequentially from a hopper to a different location and introducing them to a feeding device that will move them in substantially parallel alignment onto a depositing device. The depositing device is a circular drum having a plurality of utensil-receiving slots along its outer periphery which moves proximate the depositing device to receive a singular utensil in each slot. Each utensil is sensed as it moves along the feeding device by a photocell which causes the feeding device to advance one drum slot and the drum to receive an advancing utensil. A selectively operable feed rate device is positioned near the discharge area of the drum to regulate the rate of release of utensils from the circular drum. A conveyor or other moving device is cooperatively positioned near the circular drum and feed rate device to sequentially receive a utensil released by the drum. Thus, a continuous supply of utensils can be positioned in a container, on a plate, or in any other receptacle as it moves along the conveyor belt.

5 Claims, 2 Drawing Sheets

APPARATUS FOR HANDLING PLASTIC EATING UTENSILS

BACKGROUND OF THE INVENTION

1. Field of the Invention

The present invention relates to an apparatus for handling a plurality of generally similar elements and more particularly to an apparatus for moving a plurality of irregularly shaped utensils, particularly knives, from a stored condition to a remote location in a prearranged or preselected manner and subsequently to deposit them in receptacles such as boxes, trays or other containers positioned nearby.

2. Description of the Prior Art

There are numerous prior art devices utilized to orderly remove uniformly or symmetrically configured objects from a container and deposit these objects at a remote location. Most of these devices deal with cylindrically shaped articles such as those resulting from the continuous cutting of pipe or other such material. See for example U.S. Pat. No. 2,159,851. Handling a cylindrical object is considerably less troublesome, since its circular nature results in predictable behavior as it is selected, moved and deposited at a remote location.

There is a distinct need to utilize automatic equipment for handling large volumes of irregularly configured objects such as plastic eating utensils. Packaged, ready to eat food for airlines and other forms of transportation as well as for retail outlets which require such objects entail a considerable number of people and a great deal of time to prepare. Certain devices have been utilized to assist in the handling of items of this nature (see, for example, U.S. Pat. No. 4,892,182) however, there appears to be nothing in the marketplace to automatically engage such utensils and ultimately position them in an appropriate receptacle in a sequential manner so that a moving endless array of such receptacles can be brought into proximity with the device to receive one or more such utensils without manual assistance.

The present invention has been developed to address the long felt need for automatic machinery to handle these irregularly shaped, high volume items.

SUMMARY AND OBJECTIVES OF THE INVENTION

The general purpose of the present invention, which will be described subsequently in greater detail, is to provide an apparatus that will automatically engage, advance and selectively deposit plastic eating utensils in a desired container at a rate that will enable a rapid flow of such containers to be supplied proximate the apparatus. In that regard, it is a primary object of the present invention to provide a new, automatic mechanism for handling plastic eating utensils that has all of the advantages of prior art machinery and none of the disadvantages.

Another object of the present invention is to provide a relatively uncomplicated mechanism that is able to handle and sequentially deposit non-symmetrical, lightweight items that previously have not been susceptible to automation.

A further object of the present invention is to provide a mechanism which is easily adjustable to handle a wide range of items and sizes to be conveyed.

Yet another object of the present invention is to provide an economical and reliable automatic device for handling plastic eating utensils, particularly knives.

In preferred form, the present invention includes a hopper for holding a plurality of plastic eating utensils, a multidirectional cooperating conveyor belt, feed means for receiving the utensils from the conveyor belt and moving them to a different location, and a deposit mechanism that receives the utensils from the feed means and selectively deposits them at a precise location or in a receptacle cooperatively moving nearby. A selectively operable feed rate device is positioned near the discharge area of the deposit mechanism to regulate the rate of release of utensils from the deposit mechanism. The moving receptacle is carried by a conveyor cooperatively located to selectively receive the deposited utensils from the feed rate device. Appropriate and conventional control devices enable the apparatus to move faster or slower as the nature of the undertaking requires. The conveyor is also powered by conventional means to operably keep pace with the sequential depositing of such utensils.

There has been outlined, rather broadly, the more important objectives of the invention in order that the detailed description that follows may be better understood, and in order that the present contribution to the art may be better appreciated. There are additional features of the invention that will be described hereinafter and which will form the subject matter of the claims appended hereto. In this respect, before explaining one embodiment of the invention in detail, it is to be understood that the invention is not limited in its application to the details of construction and to the arrangement of the components set forth in the following description or illustrated in the drawings. The invention is capable of other embodiments and of being practiced and carried out in various ways. It is to be understood that the phraseology and terminology employed herein are for the purpose of description and should not be regarded as limiting. Those skilled in the art will appreciate the conception upon which this disclosure is based and that may readily be utilized as the basis for the designing of other structures, methods and systems for carrying out the several purposes of the present invention. The claims are to be regarded as including all equivalent constructions that do not depart from the spirit and scope of the present inventive concept.

BRIEF DESCRIPTION OF THE DRAWINGS

The invention will be better understood and objects other than those set forth above will become apparent when consideration is given to the following detailed description which makes reference to the annexed drawings wherein like characters of reference designate like parts throughout the several views and wherein.

DESCRIPTION OF THE PREFERRED EMBODIMENT

Figure 1:
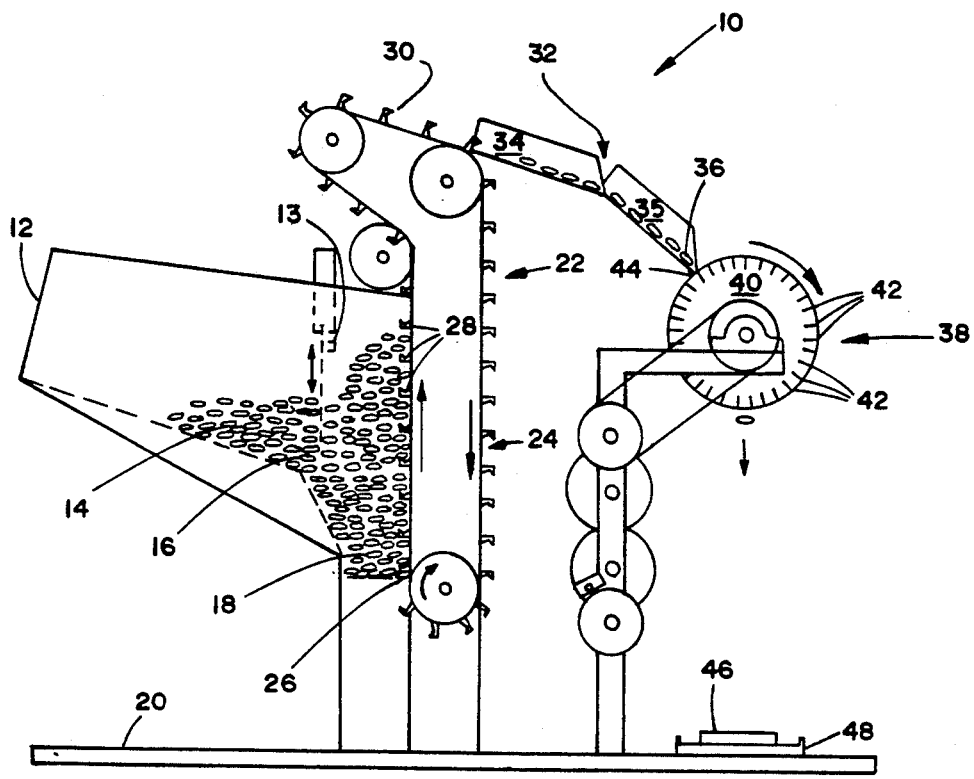
FIG. 1 is a side elevational, sectional and schematic view of the apparatus for handling plastic eating utensils comprising the present invention.
Figure 2:
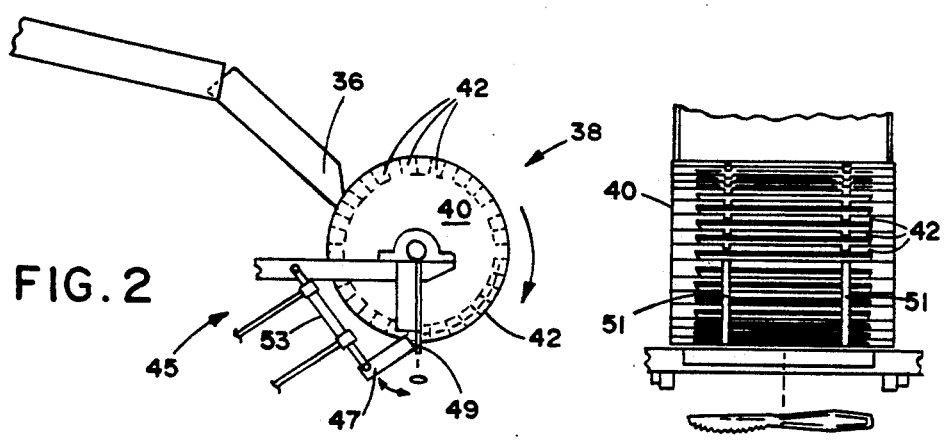
FIG. 2 is a side elevational, fragmentary and schematic view of the slotted circular drum comprising the depositing means and the selectively operable feed rate device associated therewith.
Figure 3:
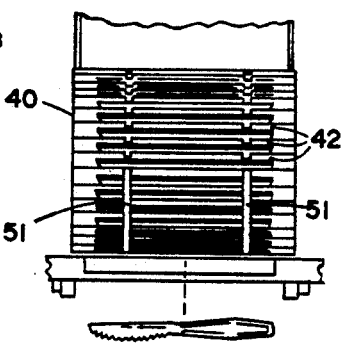
FIG. 3 is a front elevational and fragmentary view of the slotted circular drum shown in FIGS. 1 and 2.
Figure 4:
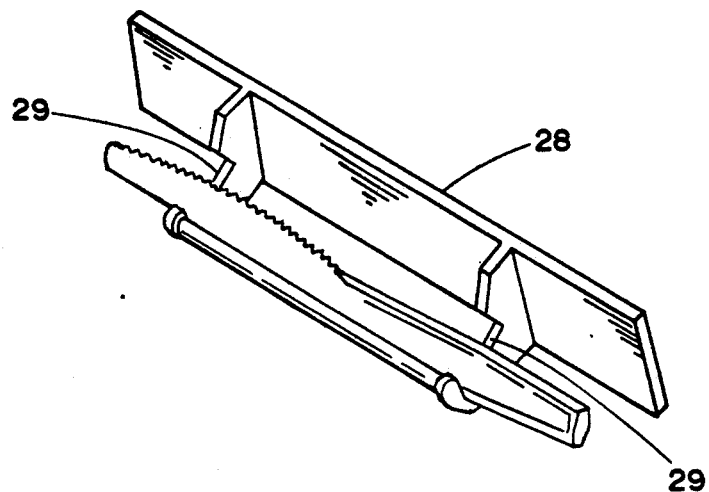
FIG. 4 is a perspective and isolated view of a shelf utilized with the multidirectional conveyor.
Figure 5:
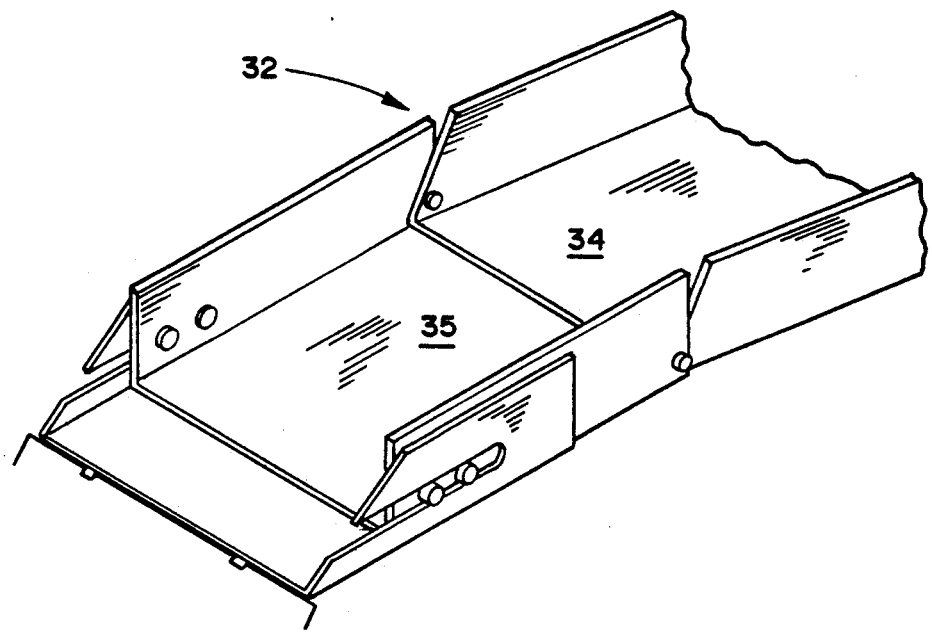
FIG. 5 is a perspective and isolated view of the feed means of the present invention.

With reference to the drawings and particularly to FIG. 1, an apparatus for handling plastic eating utensils shown generally as 10 consists of a hopper 12 for holding a plurality of plastic eating utensils, in this example knives 14, which are stacked upon one another in a substantially parallel relationship. An adjustable opening 16 regulates the flow of utensils to the output end 18 of hopper 12. Hopper 12 is positioned on and maintained by a base 20 or other suitable supporting surface, although the individual components of the present invention can be free standing, each component having its own supporting base.

Utensil removing means shown generally as 22 is formed from a multidirectional conveyor 24 engaging at its lower portion 26 a plurality of utensils 18. Conveyor 24 has a plurality of shelves 28 to collect one or more of utensils 18 on each shelf as the shelf is lifted upwardly through the collection of utensils 18. The collection of utensils is allowed to extend upwardly along conveyor 24 to ensure the positioning of at least one utensil on each shelf ledge 29.

A second conveyor portion 30 cooperatively guides the collected utensils upwardly but at a slightly more severe angle so that the incline causes all but one of the utensils to fall back into hopper 12. Thus, a single utensil is lifted around the top of conveyor 30 and onto feed means shown generally as 32. Feed means 32 is comprised of a chute 34, preferably made of a very smooth material, such as stainless steel, to enable the deposited utensils to slide downwardly in a substantially parallel alignment. Feed means 32 also includes a photoelectric cell 36 that senses the passing movement of a utensil and triggers in a conventional manner the operation of a ratcheting device that will be described in more detail subsequently.

Deposit means 38, maintained by base 20 or its own separate base, includes a circular drum 40 whose circumference or outer periphery is provided with a plurality of slots 42 suitable in size to form a holding container for an individual utensil deposited therein by feed means 32. Drum 40 rotates (see arrow) and receives a utensil when the end 44 of tray 34 is in alignment with the opening of a slot 42.

Photocell 36, connected to appropriate and conventional advancing circuitry, causes tray 35 to advance one slot opening each time a utensil moves through its beam. If the utensil misses the slot for some reason, tray 34 is movably connected with the circuitry to advance with the still empty slot for at least two steps so that a utensil will ultimately be positioned therein.

As drum 40 continues its rotation, the utensil held in slot 42 eventually moves to the lower side of the cylinder where gravity causes it to fall downwardly. Retaining members 51 hold the utensils within the slots 42 until they are released. A selectively operable feed rate device, shown generally as 45, is positioned near the discharge area of the drum to regulate the rate of sequential release of utensils from the circular drum. Device 45 has a triggering element 47 connected to an air cylinder 53 actuated by photocell 36 that releases a utensil consistent with the flow rate utilized in drum 40. The utensils dropped in accordance with the flow rate established are collected by a container receptacle 46 movable positioned on a conveyor belt 48. Thus a plurality of receptacles 46 are sequentially moved along conveyor 48 underneath drum 40 to receive synchronously and sequentially dropped utensils. Obviously, the feed rate of the apparatus can be varied as can be the linear speed of the conveyor belt so that containers 46 can work synchronously with drum 40 as it sequentially drops single utensils.

Motors and circuitry utilized in the present inventive concept are conventional, and no claim of novelty is made to any of those components. With respect to other components of the present invention and to the concept as a whole, it is to be realized that the optimum dimensional relationships for the parts of the invention to include variations in size, materials, shape, form, function and manner of operation, assembly and use are deemed readily apparent and obvious to one skilled in the art, and all equivalent relationships to those illustrated in the drawings and described in the specification are intended to be encompassed herein.

Therefore, the foregoing is considered as illustrative only of the principles of the invention. Since numerous modifications and changes will readily occur to those skilled in the art, the present invention is not limited to the exact construction and operation shown and described. All suitable modifications and equivalents that fall within the scope of the appended claims are deemed within the present inventive concept.

What is claimed is:

1. An apparatus for handling plastic eating utensils comprising: a hopper for holding a plurality of elongated nonuniform eating utensils stacked upon one another in a substantial parallel relationship; means operable with the hopper for removing utensils from the hopper and moving the utensils in a substantially parallel relationship to a different location; feed means receiving the utensils from the removing means and directing the utensils to another location in a substantially parallel relationship; deposit means receiving the utensils from the feed means and selectively and singularly depositing the utensils at a remote location thereafter; and a selectively operable feed rate device positioned proximate the circular drum to regulate the rate of release of utensils from the circular drum, the feed means including means sensing the movement of a utensil and thereby operating the movement of the deposit means to receive the utensil, the hopper including means to vary the rate of removal of utensils from the hopper by the removing means, the utensil removing means including a conveyor having a first vertical directional portion and a second differing directional cooperating portion positioned adjacent the first portion to receive utensils therefrom and cause the received utensils to progress singularly to the feed means, and the deposit means including a circular drum rotatable about a horizontal axis having a plurality of utensil-receiving slots along its outer periphery.

2. The apparatus as claimed in claim 1, the feed means including first and second hingedly connected chutes.

3. The apparatus as claimed in claim 2, the hopper removal means including a movable drum receiving slot engaging member to direct a moving utensil into the slot.

4. The apparatus as claimed 3, the feed rate device including a sensing device, a triggering element, and retaining members cooperating to retain utensils in designated drum slots until released therefrom at a preselected location.

5. The apparatus as claimed in claim 3, the horizontally rotatable drum having two circularly formed spaced apart sides with circular peripheries of slots being radially formed from the side peripheries toward the hub and extending from one side periphery to the other side periphery.

* * * * *